United States Patent
Tharpe, III et al.

(10) Patent No.: US 11,716,772 B1
(45) Date of Patent: Aug. 1, 2023

(54) RAPID PROTOTYPING OF AN INTERNET OF THINGS DEVICE, SUCH AS A DEVICE FOR COMMUNICATING WITH A WIRELESS CELLULAR NETWORK

(71) Applicant: T-Mobile USA, Inc., Bellevue, WA (US)

(72) Inventors: James Benjamin Tharpe, III, Roswell, GA (US); Robert William Snell, Seattle, WA (US); Eric Steven Hill, Frisco, TX (US); Jim Joojin Song, Suwanee, GA (US)

(73) Assignee: T-Mobile USA, Inc., Bellevue, WA (US)

( * ) Notice: Subject to any disclaimer, the term of this patent is extended or adjusted under 35 U.S.C. 154(b) by 1 day.

(21) Appl. No.: 17/484,223

(22) Filed: Sep. 24, 2021

(51) Int. Cl.
  *G06F 9/44* (2018.01)
  *G06F 9/455* (2018.01)
  *G06F 9/445* (2018.01)
  *H04W 76/10* (2018.01)
  *G06F 8/34* (2018.01)
  *G06F 8/61* (2018.01)

(52) U.S. Cl.
  CPC .............. *H04W 76/10* (2018.02); *G06F 8/34* (2013.01); *G06F 8/61* (2013.01)

(58) Field of Classification Search
  CPC ............. G06F 8/34; G06F 8/61; H04W 76/10
  See application file for complete search history.

(56) References Cited

U.S. PATENT DOCUMENTS

| | | | |
|---|---|---|---|
| 5,758,081 | A | 5/1998 | Aytac |
| 5,889,954 | A | 3/1999 | Gessel et al. |
| 6,134,515 | A | 10/2000 | Skogby |
| 6,226,286 | B1 | 5/2001 | Danne et al. |
| 6,343,263 | B1 | 1/2002 | Nichols et al. |
| 6,363,411 | B1 | 3/2002 | Dugan et al. |

(Continued)

FOREIGN PATENT DOCUMENTS

| | | | | |
|---|---|---|---|---|
| CA | 2303987 C | * | 11/2008 | ......... H04L 12/5692 |
| CN | 104699426 A | * | 6/2015 | |

(Continued)

OTHER PUBLICATIONS

Simone Mora, RaploT Toolkit: Rapid Prototyping of Collaborative Internet of Things Applications, 2016, pp. 1-8. https://dl.acm.org/doi/abs/10.1016/j.future.2018.02.030 (Year: 2016).*

(Continued)

*Primary Examiner* — Mongbao Nguyen
(74) *Attorney, Agent, or Firm* — Perkins Coie LLP

(57) ABSTRACT

System and method enable rapid prototyping of an Internet of Things (IoT) device equipped with a modem. The system creates an abstraction layer subsuming a modem AT command set, where the abstraction layer provides a higher-level functionality than the modem AT command set. A function associated with the abstraction layer includes multiple function calls to the modem AT command set. The system can receive an input indicating an instruction to initiate a connection between the modem and a telecommunication network. The system can invoke a particular function associated with the abstraction layer to establish the connection between the modem and the telecommunication network.

20 Claims, 12 Drawing Sheets

(56) References Cited

U.S. PATENT DOCUMENTS

| | | |
|---|---|---|
| 6,594,480 B1 | 7/2003 | Montalvo et al. |
| 6,611,584 B1 | 8/2003 | Khello et al. |
| 6,721,282 B2 | 4/2004 | Motley |
| 6,788,933 B2 | 9/2004 | Boehmke et al. |
| 6,804,711 B1 | 10/2004 | Dugan et al. |
| 6,975,705 B2 | 12/2005 | Boehmke et al. |
| 7,061,923 B2 | 6/2006 | Dugan et al. |
| 7,080,144 B2 | 7/2006 | Boehmke |
| 7,099,660 B2 | 8/2006 | Boehmke |
| 7,137,565 B2 | 11/2006 | Van et al. |
| 7,634,764 B2 * | 12/2009 | Heinz .................. G06F 8/30 717/136 |
| 7,756,475 B2 | 7/2010 | Rambo |
| 7,894,400 B2 | 2/2011 | Rahman et al. |
| 7,913,223 B2 | 3/2011 | Taber |
| 7,991,398 B2 | 8/2011 | Rune |
| 8,005,112 B2 | 8/2011 | Agmon et al. |
| 8,036,600 B2 | 10/2011 | Garrett et al. |
| RE43,046 E | 12/2011 | Bourgart |
| 8,160,565 B2 | 4/2012 | Wang et al. |
| 8,271,944 B2 | 9/2012 | Austin et al. |
| 8,416,769 B2 | 4/2013 | Lewis |
| 8,498,401 B2 | 7/2013 | Shafique |
| 8,634,302 B2 | 1/2014 | Khawer et al. |
| 8,953,488 B2 | 2/2015 | Puthenpura et al. |
| 9,087,296 B2 | 7/2015 | Sakunkoo et al. |
| 9,148,288 B2 | 9/2015 | Stewart |
| 9,330,511 B2 | 5/2016 | Webber et al. |
| 9,332,579 B2 | 5/2016 | Scherer et al. |
| 9,413,829 B2 | 8/2016 | Scherer et al. |
| 9,473,985 B2 | 10/2016 | Mattsson et al. |
| 9,565,318 B2 | 2/2017 | Tapia et al. |
| 9,565,629 B2 | 2/2017 | Ljung |
| 9,608,830 B2 | 3/2017 | Perez Martinez et al. |
| 9,820,089 B2 | 11/2017 | Annamalai |
| 9,838,483 B2 | 12/2017 | Mcmurry et al. |
| 10,057,844 B2 | 8/2018 | Lau |
| 10,117,090 B2 | 10/2018 | Jahangir et al. |
| 10,200,943 B2 | 2/2019 | Garcia Martin et al. |
| 10,225,746 B2 | 3/2019 | Mohammed et al. |
| 10,291,689 B2 | 5/2019 | Parikh et al. |
| 10,349,454 B1 | 7/2019 | Elbaz et al. |
| 10,420,162 B2 | 9/2019 | Gunnarsson et al. |
| 10,536,466 B1 | 1/2020 | Griffin |
| 10,735,553 B2 | 8/2020 | Johnston et al. |
| 10,805,791 B2 | 10/2020 | Synal et al. |
| 10,869,162 B2 | 12/2020 | Annamalai |
| 10,880,385 B2 | 12/2020 | Bugenhagen et al. |
| 10,904,398 B1 | 1/2021 | Kumar et al. |
| 10,952,274 B2 | 3/2021 | Gunnarsson et al. |
| 11,115,537 B1 * | 9/2021 | Liu .................. H04M 3/5166 |
| 2002/0054629 A1 | 5/2002 | Roos |
| 2002/0083166 A1 | 6/2002 | Dugan et al. |
| 2002/0119771 A1 | 8/2002 | Boehmke et al. |
| 2002/0126822 A1 | 9/2002 | Boehmke et al. |
| 2002/0136224 A1 | 9/2002 | Motley |
| 2003/0101447 A1 | 5/2003 | Nathan et al. |
| 2005/0109837 A1 | 5/2005 | Van et al. |
| 2005/0141492 A1 | 6/2005 | Chan |
| 2005/0195854 A1 | 9/2005 | Agmon et al. |
| 2005/0249139 A1 | 11/2005 | Nesbit |
| 2006/0276131 A1 | 12/2006 | Rambo |
| 2007/0115898 A1 | 5/2007 | Stein |
| 2007/0197222 A1 | 8/2007 | Rune |
| 2007/0206750 A1 | 9/2007 | Bedingfield |
| 2008/0198804 A1 | 8/2008 | Rahman et al. |
| 2009/0028131 A1 | 1/2009 | Chowdhury et al. |
| 2009/0217097 A1 | 8/2009 | Laperi et al. |
| 2010/0093396 A1 | 4/2010 | Roundtree |
| 2010/0284335 A1 | 11/2010 | Raty |
| 2010/0296508 A1 | 11/2010 | Lewis |
| 2010/0305931 A1 | 12/2010 | Fordham |
| 2011/0280187 A1 | 11/2011 | Meyer |
| 2011/0294489 A1 | 12/2011 | Wang et al. |
| 2012/0026865 A1 | 2/2012 | Fan et al. |
| 2012/0028636 A1 | 2/2012 | Khawer et al. |
| 2012/0093075 A1 | 4/2012 | Derkach et al. |
| 2012/0147782 A1 | 6/2012 | Puthenpura et al. |
| 2012/0278378 A1 | 11/2012 | Lehane et al. |
| 2013/0022193 A1 | 1/2013 | Shafique |
| 2013/0100913 A1 | 4/2013 | Scherer et al. |
| 2013/0111046 A1 | 5/2013 | Scherer et al. |
| 2013/0166440 A1 | 6/2013 | Aguilar et al. |
| 2013/0198396 A1 | 8/2013 | Scherer et al. |
| 2013/0223432 A1 | 8/2013 | Cook |
| 2013/0229948 A1 | 9/2013 | Stewart |
| 2013/0235822 A1 | 9/2013 | Scherer et al. |
| 2013/0308511 A1 | 11/2013 | Ljung |
| 2014/0304214 A1 | 10/2014 | Sakunkoo et al. |
| 2015/0061826 A1 | 3/2015 | Webber et al. |
| 2015/0067807 A1 | 3/2015 | Williams et al. |
| 2015/0195006 A1 | 7/2015 | Dardenne et al. |
| 2015/0373391 A1 | 12/2015 | Naik Atul |
| 2016/0057209 A1 | 2/2016 | Parikh et al. |
| 2016/0135139 A1 | 5/2016 | Jahangir et al. |
| 2017/0208016 A1 | 7/2017 | Lehane et al. |
| 2017/0215135 A1 | 7/2017 | Lau |
| 2018/0011694 A1 * | 1/2018 | Al-Fuqaha .................. G06F 8/36 |
| 2018/0070204 A1 | 3/2018 | Annamalai |
| 2018/0132301 A1 | 5/2018 | Gunnarsson et al. |
| 2018/0146068 A1 | 5/2018 | Johnston et al. |
| 2019/0208404 A1 | 7/2019 | Georgiev |
| 2019/0273635 A1 | 9/2019 | Mcnamee et al. |
| 2019/0357293 A1 | 11/2019 | Gunnarsson et al. |
| 2020/0028744 A1 | 1/2020 | Rice et al. |
| 2020/0220791 A1 | 7/2020 | Aiello et al. |
| 2020/0288516 A1 | 9/2020 | Elbaz et al. |
| 2020/0296578 A1 | 9/2020 | Synal et al. |
| 2021/0014673 A1 | 1/2021 | Synal et al. |
| 2021/0105364 A1 | 4/2021 | Kumar et al. |
| 2022/0263917 A1 * | 8/2022 | Simons .................. H04L 67/01 |
| 2022/0308841 A1 * | 9/2022 | Coil .................. G06F 8/30 |

FOREIGN PATENT DOCUMENTS

| | | | | |
|---|---|---|---|---|
| CN | 110999258 A | * | 4/2020 | ............ H04L 29/08 |
| EP | 1273992 A1 | * | 1/2003 | ............ G06F 21/313 |
| TW | 201018201 A | * | 5/2010 | ............ H04M 11/06 |

OTHER PUBLICATIONS

Francesco Gianni, Rapid Prototyping Internet of Things Applications for Augmented Objects: The Tiles Toolkit Approach, 2019, lines 1-16. https://ntnuopen.ntnu.no/ntnu-xmlui/handle/11250/2590468 (Year: 2019).*

* cited by examiner

| Task | "Original" | C++ |
|---|---|---|
| Configure the modem to connect to a cellular network | ATE0<br>AT+QCFG="usbcfg",0x2C7C,0x125,1,1,1,1,1,1,1<br>AT+QPCMV=1,2<br>AT+QTONEDET=1<br>AT+QPOWD | ec25.configure() |
| Send an SMS message | AT+CMGF=1<br>AT+CSCS="GSM"<br>AT+CMGS=" phoneNumber"<br>message<br>Ctrl+Z | ec25.sendSMS(phoneNumber, message) |
| Receive an SMS | AT+CSDH=0<br>AT+CMGF=1<br>AT+CMGL="REC UNREAD" | ec25.receiveSMS(sms) |
| Place a voice call | ATD phoneNumber | ec25.placeVoiceCall(phoneNumber) |
| End a voice call | ATH | ec25.endCall() |
| Get call status (e.g. connected, disconnected) | +CPAS: 4 | ec25.getCallStatus() |
| Receive a voice call | ATA | ec25.receiveVoiceCall() |
| Send an MMS | AT+QICSGP=1,3,fast.t-mobile.com,,,1<br>AT+QIACT=1<br>AT+QMMSCFG="contextid",1<br>AT+QMMSCFG="mmsc","http://mms.msg.eng.t-mobile.com/mms/wapenc"<br>AT+QMMSCFG="sendparam",6,2,0,0,2,4<br>AT+QMMSCFG="character","ASCII"<br>AT+QMMSEDIT=1,1,"phoneNumber"<br>AT+QMMSEDIT=5,1,"attachment-file-name"<br>AT+QMMSEND=100<br>AT+QMMSEDIT=0<br>AT+QIDEACT=1<br>AT+QFDEL="attachment-file-name" | ec25.sendMMS(mmsConfig, recipient, cc, bcc, title, attachment) |

*FIG. 7A*

RAPID PROTOTYPING OF AN INTERNET OF THINGS DEVICE, SUCH AS A DEVICE FOR COMMUNICATING WITH A WIRELESS CELLULAR NETWORK

BACKGROUND

Single-board computers in various forms, such as a Raspberry Pi, a Beaglebone, or an Arduino, are ubiquitous today among "Makers" and in professional settings where automation of electrical components is required. Generally, they are cheap and easy to program; however, when such projects require cellular connectivity the integration of cellular features is difficult to perform and requires specialized knowledge beyond that which a typical "maker", electrical engineer, or software developer would already have. For example, a user needs extensive knowledge of serial port communications and "AT" commands to configure and control a cellular modem. This extensive knowledge and expertise present a barrier to entry and creates development delays.

BRIEF DESCRIPTION OF THE DRAWINGS

Detailed descriptions of implementations of the present invention will be described and explained through the use of the accompanying drawings.

FIG. 7A shows a side-by-side comparison of a task to be completed, the AT set of commands needed to program the modem, and the set of commands that can be used with the disclosed technology.

Figure 1:
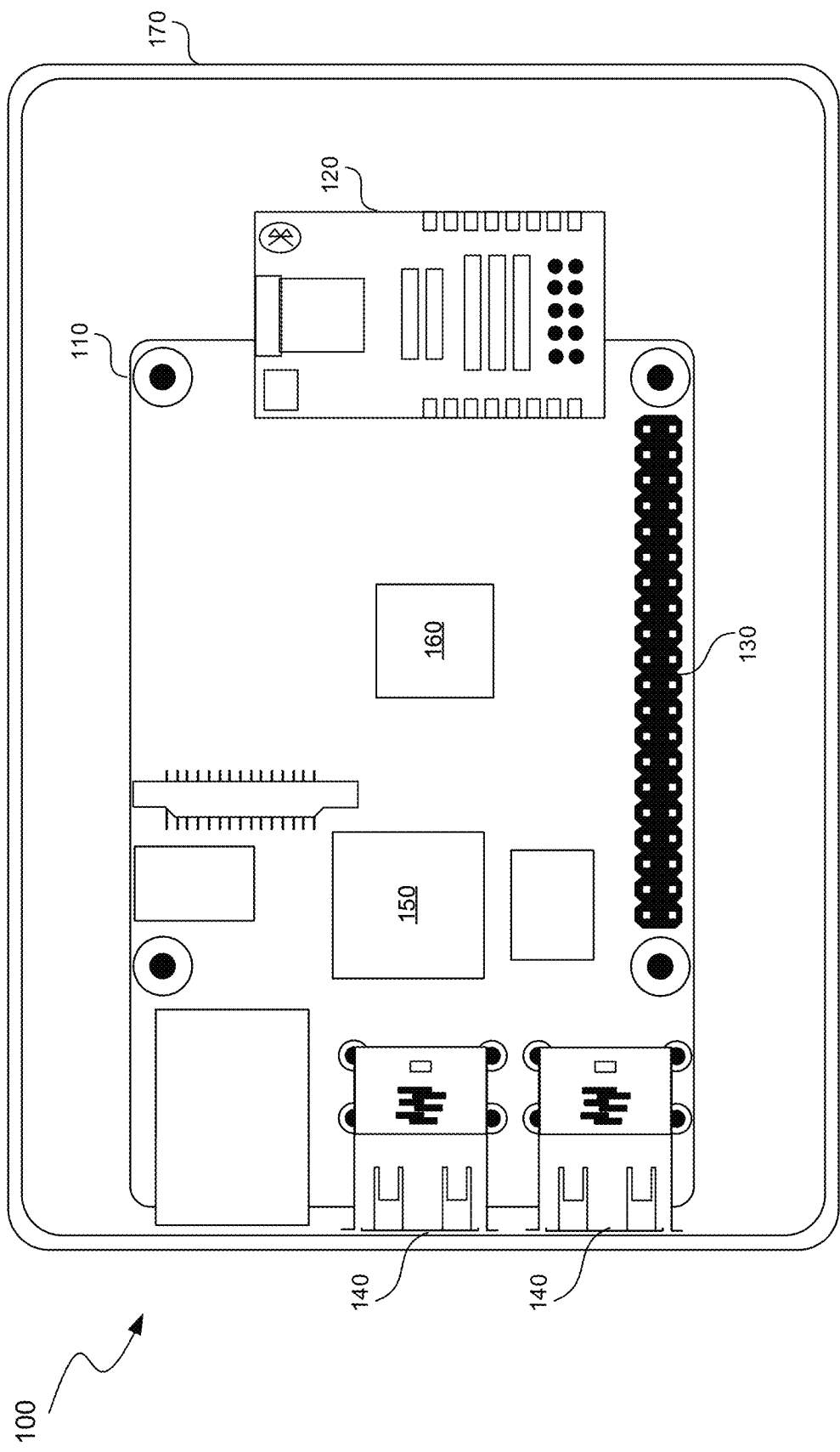
FIG. 1 shows a low-cost computer having a single motherboard with a cellular modem.

The technologies described herein will become more apparent to those skilled in the art from studying the Detailed Description in conjunction with the drawings. Embodiments or implementations describing aspects of the invention are illustrated by way of example, and the same references can indicate similar elements. While the drawings depict various implementations for the purpose of illustration, those skilled in the art will recognize that alternative implementations can be employed without departing from the principles of the present technologies. Accordingly, while specific implementations are shown in the drawings, the technology is amenable to various modifications.

DETAILED DESCRIPTION

The disclosed device and software enables rapid prototyping of Internet of Things (IoT) devices by providing a low-cost single motherboard computer (single-board computer or SBC) with an integrated cellular modem that can automatically connect to a wireless telecommunication network. The cellular modem can be an 2G, 3G, LTE, 4G, 5G etc. modem. The single motherboard computer can be a Raspberry Pi computer, an Arduino, or any device capable of serial port communication, while the integrated cellular modem can communicate using any hardware-supported cellular protocols over a cellular wireless network. The modem can be configured to execute instructions associated with a modem AT command set, which is poorly documented, is hard to understand for most implementers, and requires extensive expertise to operate.

The disclosed software creates an application programming interface (API) subsuming the modem AT command set, where the API provides a higher-level functionality than the modem AT command set and where a function associated with the API includes multiple function calls to the modem AT command set. A user can easily enable the modem to establish connection to the telecommunication network by invoking, for example, a single API function using a familiar programming language or drag-and-drop tool in place of cryptic, difficult-to-understand AT commands.

A typical device can include a touchscreen, multiple general-purpose input/output (GPIO) pins, and multiple USB ports. Through the GPIO and USB ports, the device allows connection of various external devices, such as sensors to measure acceleration, orientation, temperature, pollution, humidity, etc. The typical device can be used as a controller of other devices through various wired and wireless connections and connection protocols. The device can be installed close to the location where the data is gathered and can perform the needed computation locally, therefore improving response times and saving network bandwidth. The device can be enclosed within a waterproof case and be able to operate in a humid or watery environment.

The typical device can store in a flash or a programmable read-only memory (PROM) memory a base operating system (OS) version and drivers for peripherals, GPIO pins, USB ports, and the modem. Further, the memory can store a simple application, launched at startup, that configures an available modem to connect to an available cellular network.

Various examples of the invention will now be described. The following description provides certain specific details for a thorough understanding and enabling description of these examples. One skilled in the relevant technology will understand, however, that the invention may be practiced without many of these details. Likewise, one skilled in the relevant technology will also understand that the invention may include many other obvious features not described in detail herein. Additionally, some well-known structures or functions may not be shown or described in detail below, to avoid unnecessarily obscuring the relevant descriptions of the various examples.

The description and associated drawings are illustrative examples and are not to be construed as limiting. This disclosure provides certain details for a thorough understanding and enabling description of these examples. One skilled in the relevant technology will understand, however, that the invention can be practiced without many of these details. Likewise, one skilled in the relevant technology will understand that the invention can include well-known structures or features that are not shown or described in detail, to avoid unnecessarily obscuring the descriptions of examples.

Rapid Prototyping of an Internet of Things Device

FIG. 1 shows a low-cost computer ("device") 100 having a single motherboard 110 with a cellular modem 120. The motherboard 110 can contain multiple I/O points coupled to the single motherboard, where the multiple I/O points are configured to gather sensor inputs from a surrounding environment. The multiple I/O points can include at least 40 GPIO pins 130 and multiple USB ports 140 configured to communicate with one or more external sensors. The GPIO pins 130 and USB ports 140 (collectively, the multiple I/O points 130, 140) are accessible at an exterior of the computer enclosure.

A GPIO pin is an uncommitted digital signal pin on an integrated circuit or electronic circuit board whose behavior—including whether it acts as input or output—is controllable by the user at run time. The user can define the purpose and behavior of the GPIO connecting an integrated circuit, such as a sensor, to the GPIO pin. A GPIO pin's state can be exposed to the software developer through one of a number of different interfaces, such as a memory-mapped peripheral, or through dedicated IO port instructions. GPIO pins can be configured to be input or output, GPIO pins can be enabled/disabled, GPIO pin input values are readable (typically high or low), GPIO pin input values are writable/readable, and GPIO pin input values can often be used as interrupts, typically for wakeup events, such as transitioning a processor from a low or medium power mode to a high-power mode.

The motherboard 110 can include a processor 150 and a memory 160 in communication with the modem 120 and the multiple I/O points 130, 140. The processor can be any low-power processor, such as those developed on the ARM core, Intel's Atom, etc. The memory 160 can be a flash memory or a PROM. The environmentally secure enclosure 170 can enclose the motherboard 110 and the modem 120.

The environmentally secure enclosure 170 can include a waterproof case, enabling the computer 100 to operate in a dusty, humid, or watery environment. The environmentally secure enclosure 170 can be extendable to accommodate additional sensors attached to the computer 100 or include environmentally sealable electrical/communication ports through which external sensors and other input or output devices can be connected to thereby couple such devices to the computer. The environmentally secure enclosure 170 can be large in size and capable of accommodating both the computer 100 as well as any external hardware coupled to the computer, such as an electrical component described in FIG. 2.

Figure 2:
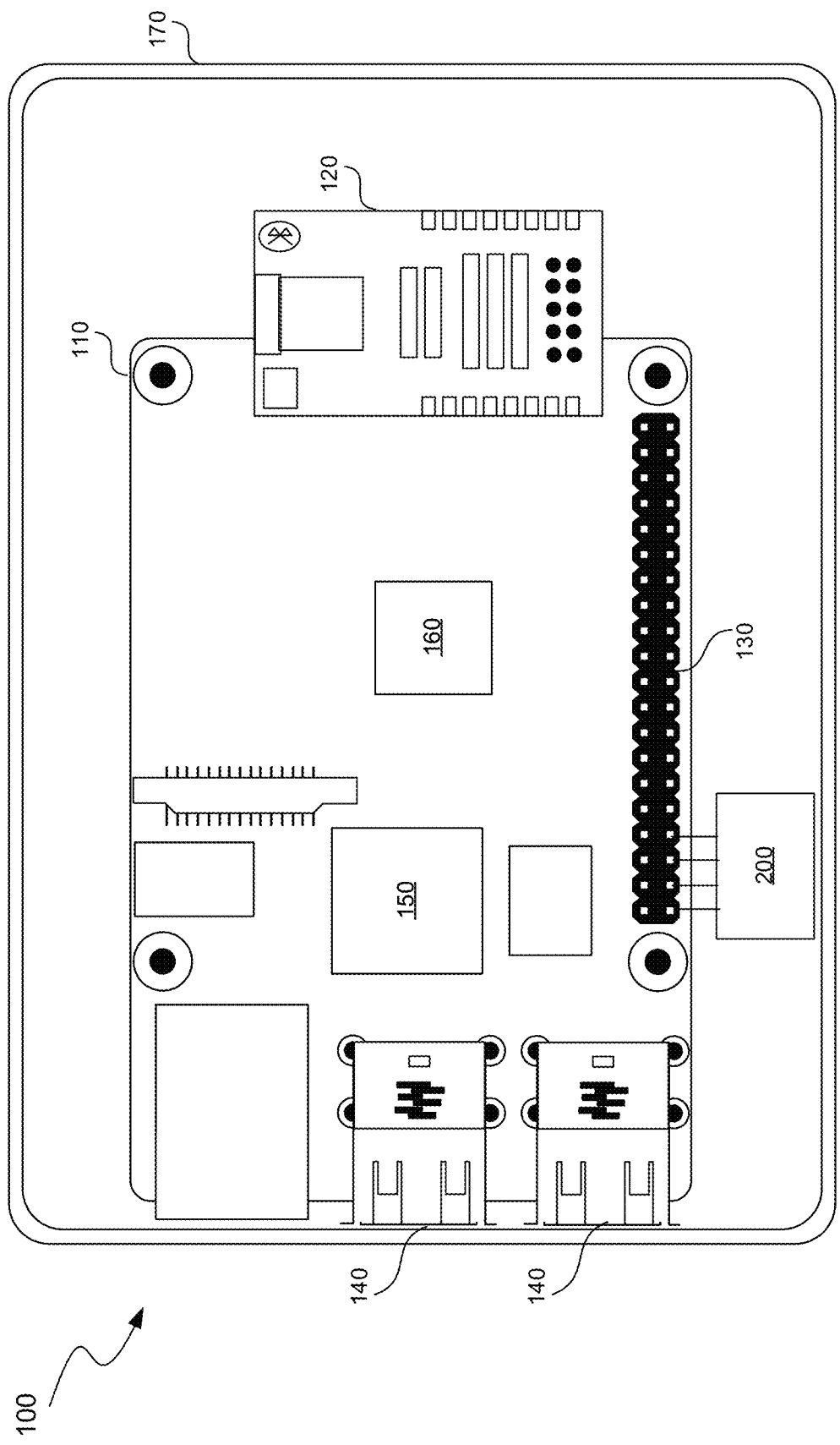
FIG. 2 shows an electrical component or additional functionality module attached to the computer.

FIG. 2 shows an electrical component 200 or additional functionality module attached to the computer 100. The electrical component 200 can be an extension to the hardware functionality of the computer 100, such as an additional power source (e.g., a battery pack or a power rectifier for an external wind generator), a camera base, a speaker base, a microphone, a sensor such as a gyro sensor, an accelerometer, a GPS receiver, etc.

The electrical component 200 can be a radio frequency sensor that can detect one or more mobile devices, such as a cell phone, a watch, a Fitbit, etc., in a surrounding environment, and can determine how the number of mobile devices in the surrounding environment varies over time. The electrical component 200 can be installed at a location such as a store, a shop, a restaurant, etc. By detecting the mobile devices in the surrounding environment, the electrical component 200 can monitor the number of visitors at the location and how that number varies over time. Consequently, the electrical component 200 can determine peak occupancy times at the location.

The electrical component 200 can be an environmental sensor that can measure one or more properties of a surrounding environment such as temperature, humidity, and/or pollution. The electrical component 200 can gather the environmental data. The electrical component 200 can analyze how the properties of the surrounding environment vary over time or can send the environmental data to a cloud computer for further analysis.

The electrical component 200 can also be a transceiver configured to communicate using an IoT communications protocol such as Bluetooth, LTE, 5G, NB-IOT, ZigBee, Z-Wave, IEEE 802.15.4, etc. For example, the electrical component 200 can communicate with a nearby device using NB-IOT to allow the computer 100, along with the electrical component 200, to be used as a hub controlling IoT devices in a home or an office.

Due to the small size of the computer 100, the computer along with the electrical component 200 can be carried in a backpack or mounted on a vehicle, such as a bike, a scooter, a car, or a bus, and can be carried throughout a geographic area to collect data from multiple sensors scattered about the geographic area. For example, the computer 100 and electrical component 200 can collect data about signal strength of an LTE or a 5G network to inform whether and where additional cell towers and/or sectors need to be installed.

In another example, the computer 100 and electrical component 200 can gather data from multiple sensors even cheaper than the electrical component 200 that measure environmental properties such as pollution, temperature, wind speed, humidity, etc. The computer 100, to preserve power, can enter a low power mode until the computer approaches an area populated with cheap sensors, from which readings need to be gathered. Upon entering an area known to have multiple cheap sensors, the computer 100 can receive a wake-up signal and can ping the cheap sensors to transmit their data to be gathered and stored at the computer 100.

Multiple computers 100 can be networked together as well and still be portable. The multiple computers 100 can be tasked to perform different collections by collecting data from different sensors. In one embodiment, multiple computers 100 can have various sensors attached to them and can each collect various measurements. One computer 100 among the multiple computers can be the coordinator computer. The coordinator computer 100 can collect and store data from the various computers 100 having various sensors collecting measurements.

The computer 100 can collect data in moving vehicles via in-vehicle diagnostic interfaces. The computer 100 can collect gas and/or atmospheric data (such as carbon monoxide levels) in building locations where power is inaccessible. The computer 100 can act as a motion or traffic counter in outdoor spaces. Three computers 100 equipped with radiofrequency (RF) radios can be networked together and used to triangulate signals from devices in communication with the three computers 100.

The computer 100 can gather the data and perform the computation using the processor 150 locally, without the need to send the data to a remote processor. The advantage of performing the computation locally, within the computer 100, is that the computer 100 can operate without an Internet or a cellular connection or with only an intermittent connection. Even if the computer 100 is reliably connected to a network, such as the Internet, the network bandwidth consumption is reduced because the data is processed locally and does not have to be transmitted through the network. In other words, the computer 100 performs data-intensive processing locally and need only provide the results of the processing externally, such as analyzing a large data set of environmental data collected locally and sending only statistically processed data via the cellular network. Further, the response time between requesting a computation and obtaining the result of the computation is improved because the computation is performed locally, without the need to transmit data to a remote cloud server to perform the computation and then transmit the results of the computation to the computer 100.

The device can store in a flash or a PROM memory a base OS version and drivers for the touch screen, GPIO pins, USB ports, and the modem. Further, the memory can store a simple application, launched at startup, that detects a strongest or best cell signal and automatically attempts to register the device with the cellular network, including asking the user for login credentials (e.g. user ID and password).

The base OS version can be the latest stable build of Linux with additional drivers for the display and modem. The modem 120 can be configured to access a predetermined cellular network, such as a T-Mobile network. Periodically, telemetry can be performed on the computer 100 so that customer support can identify the computer or device 100 on the network, even if a user hasn't logged in. The computer 100 can have a pre-provisioned eSIM with access to the cellular network. A startup application can direct an end-user to sign up with a plan or enter their cellular network credentials to sign into to an existing billing plan. The computer 100 can access a software repository with additional applications that the end-user can download from T-Mobile, which may include updates to the existing applications and further applications built after the device 100 ships.

Figure 3:
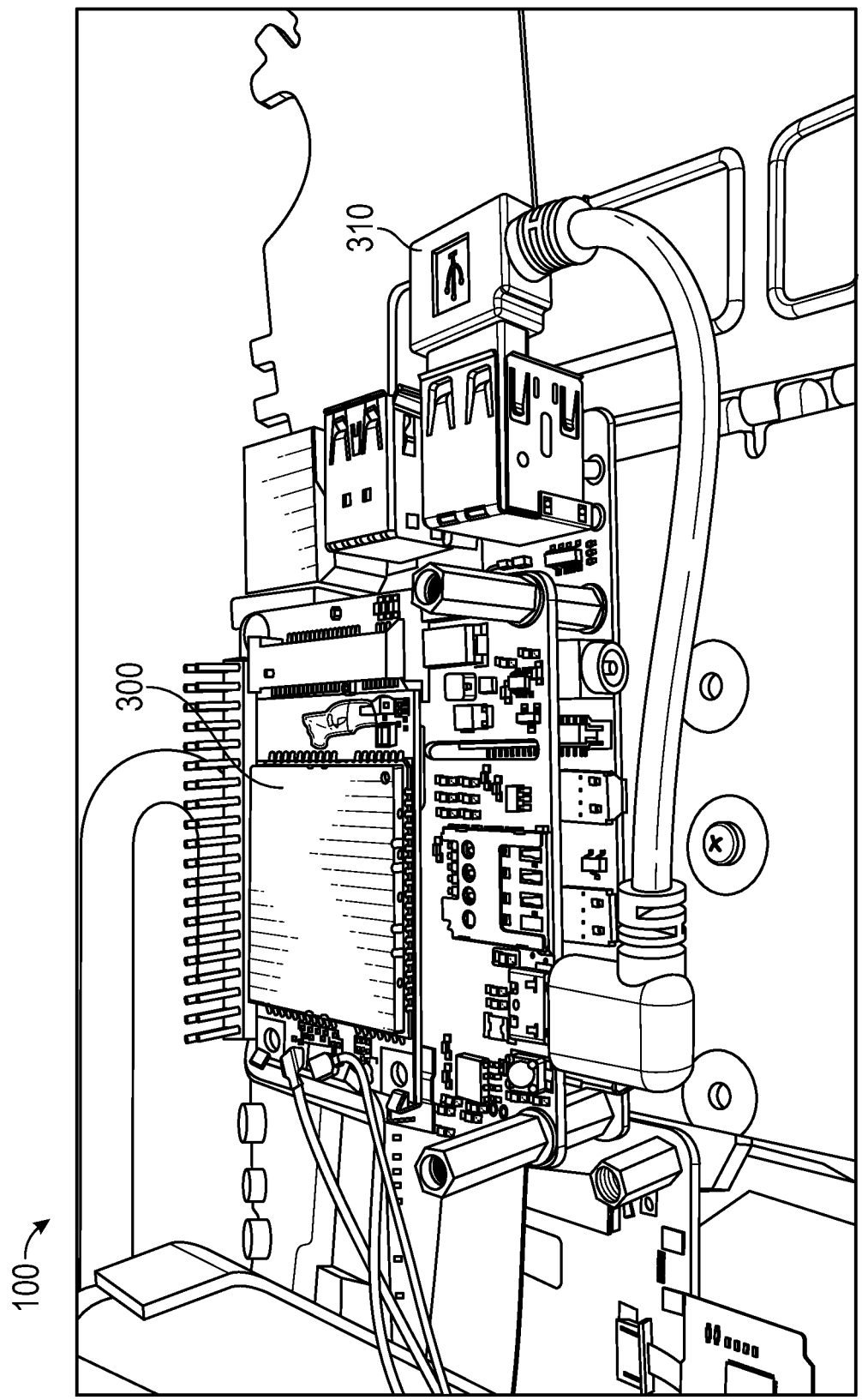
FIG. 3 shows a low-cost single-board computer.

FIG. 3 shows a low-cost single-board computer. The low-cost single-board computer 100 can be a Raspberry Pi. The computer 100 can include an cellular modem 300 and a USB port 310. The cellular modem 300 can detect an available cellular network and display the information regarding the cellular network on a touchscreen display. The cellular modem 300 can communicate with the processor of the computer 100 using the USB port 310.

Figure 4:
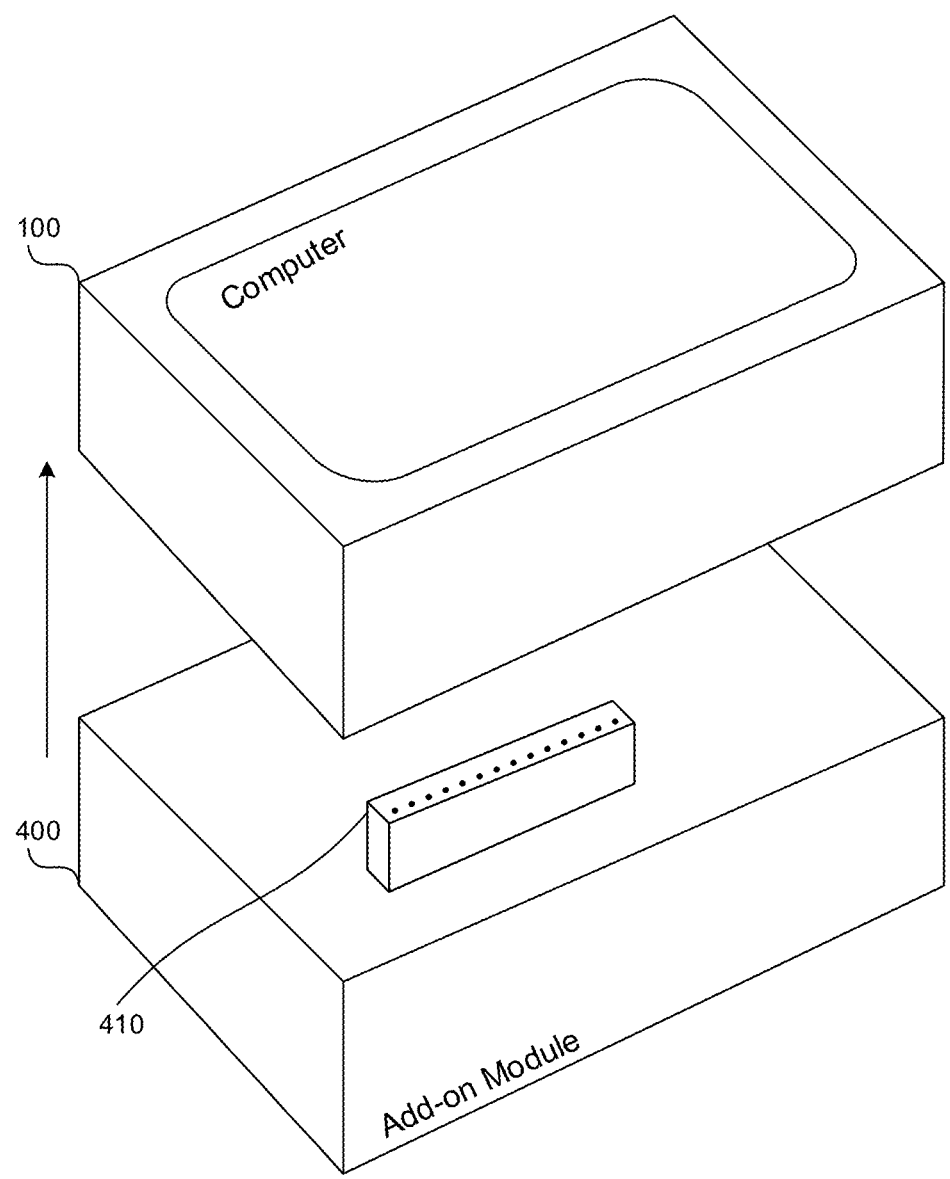
FIG. 4 shows an add-on module that can attach to the GPIO pins.

FIG. 4 shows an add-on module 400 that can attach to the GPIO pins 130 in FIG. 1. The add-on module 400 can have the same height and width as the computer 100. The add-on module 400 can have pins 410 that can attach to the GPIO pins 130 of the computer 100. The add-on module 400 can be a battery pack for the computer 100, a sensor, and/or an electrical component described in FIG. 2.

Figure 5:
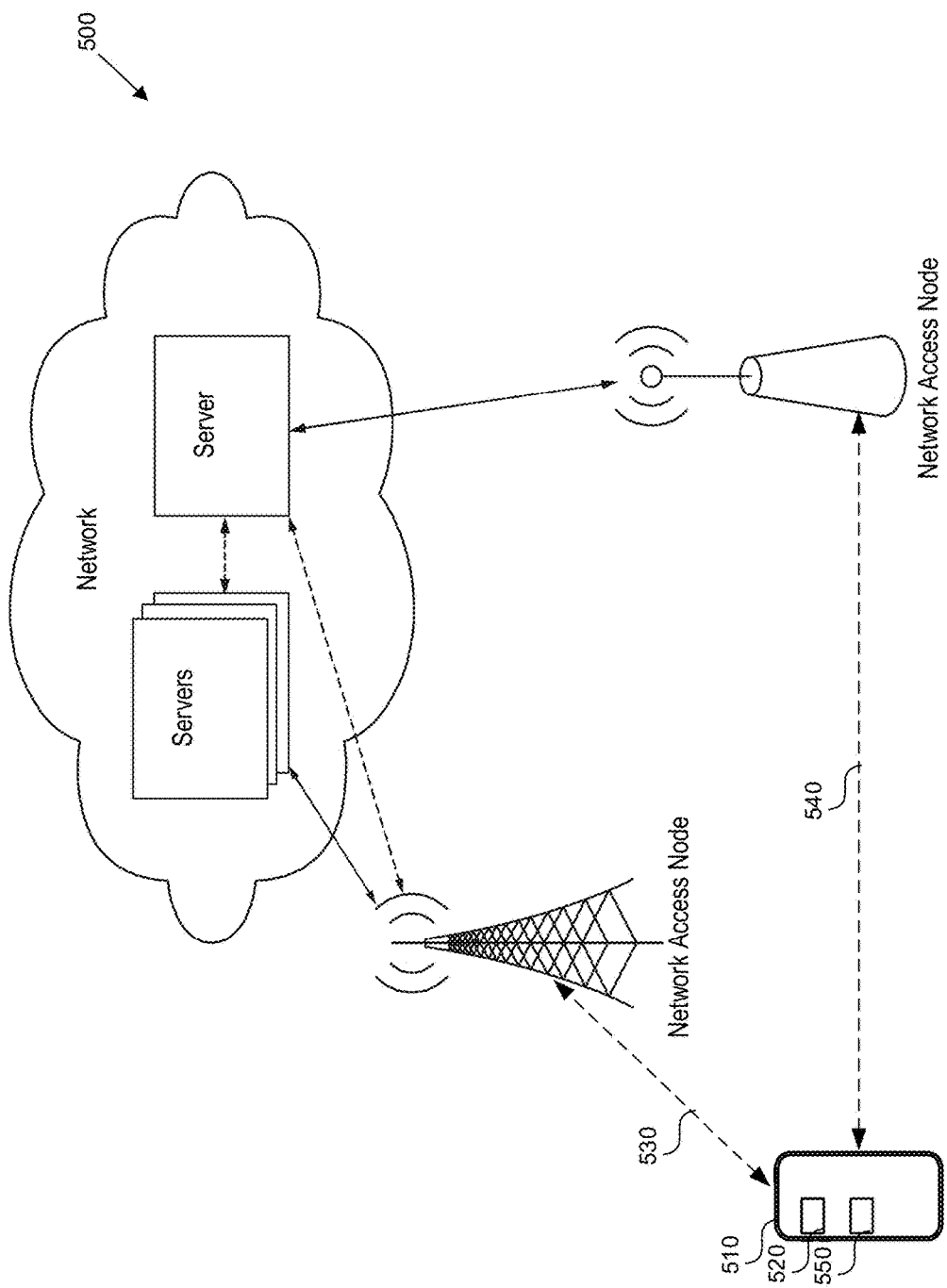
FIG. 5 shows an electronic device with a modem communicating with a telecommunication network.

FIG. 5 shows an electronic device 510 with a modem communicating with a telecommunication network 500. The electronic device 510, which is capable of serial port communication, can be a low-cost single motherboard computer such as a Raspberry Pi or an Arduino. The electronic device 510 includes a modem 520 configured to connect to the telecommunication network 500.

To connect the modem 520 to the telecommunication network 500, through connections 530, 540, the modem 520 needs to be programmed using a modem AT command set, which is difficult to learn and can slow down or even discourage rapid prototyping. To address this issue, the software running on the electronic device 510 includes an abstraction layer 550 subsuming the modem AT command set, where the abstraction layer provides a higher-level functionality than the modem AT command set. The abstraction layer 550 is an API constructed based on the AT command set. A function associated with the abstraction layer can include multiple function calls to the modem AT command set.

The abstraction layer 550 can include multiple layers, at least one of which can be written in C++. The abstraction layer 550 provides bindings for other programming languages such as NodeJS, JavaScript and Python, as well as integration with a visual programming language such as Node-RED or Scratch. The abstraction layer 550 can enable the user to communicate with the modem 520 in a simplified way. For example, the user can, without issuing specific AT commands or without having to know them, instruct the modem to place a phone call or send or receive a text message, multimedia messaging service (MMS), or data. Using the abstraction layer 550, the user can interact with the modem in a modern programming language such as C++, Python, or JavaScript. In addition, through the abstraction layer 550 the user can interact with the modem using a visual programming language such as Node-RED, making the abstraction layer uniquely suitable for students and laymen.

To establish the connection 530, 540 between the electronic device 510 and the telecommunication network 500, the electronic device 510 can receive an input indicating an instruction to initiate the connection and can invoke a particular function associated with the abstraction layer to establish the connection between the modem and the telecommunication network.

Figure 6:
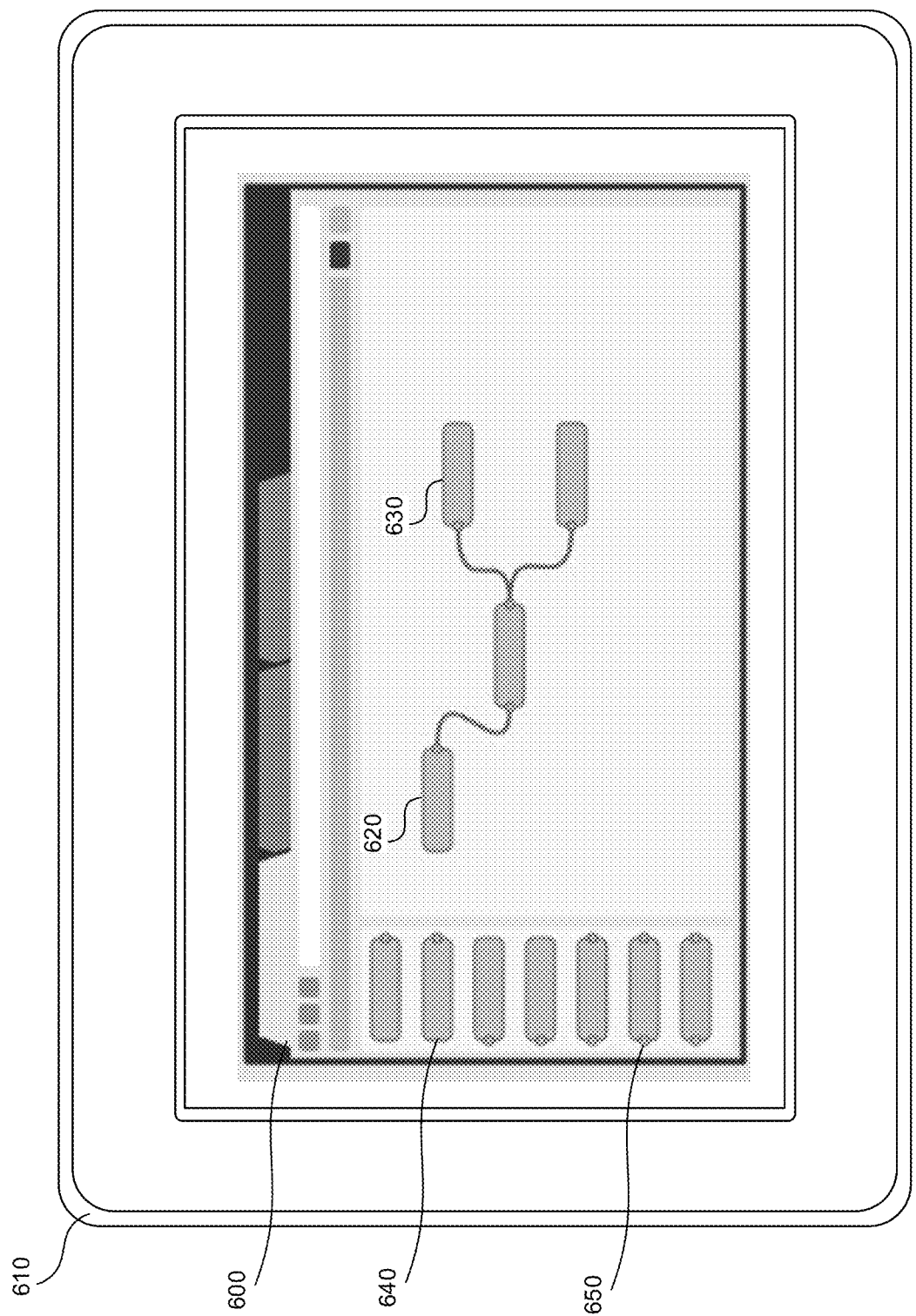
FIG. 6 shows a browser-based visual programming tool.

FIG. 6 shows a browser-based visual programming tool 600. The browser-based visual programming tool 600 running on an electronic device 610 enables visual programming by instantiating nodes 620, 630 (only two labeled for brevity). The browser-based visual programming tool 600 can be a part of the abstraction layer as described in this application. The browser-based visual programming tool 600 includes multiple nodes 640, 650 (only two labeled for brevity) from which the user can select. Unless the node 640, 650 is instantiated, the node 640, 650 is not executed. When an instantiated node 620, 630 is executed, the electronic device 610 performs instructions contained in the instantiated node 620, 630. The nodes 620, 630 can be easily wired together to create flows of instructions to the electronic device 610. The flows can be then executed in a single click.

To connect the electronic device 610 to a telecommunication network, the user can instantiate a connection node 620 in the browser-based visual programming tool 600. Upon executing the connection node 620, the electronic device 610 connects to the telecommunication network.

The electronic device 610 can provide a custom installation script configured to install the browser-based visual programming tool 600 on the electronic device 610. Upon installing the browser-based visual programming tool 600, the user can instantiate and run a single connection node 620, thus connecting the electronic device 610 to the telecommunication network.

FIG. 7A shows a side-by-side comparison of a task to be completed, the AT set of commands needed to program the modem, and the set of commands that can be used with the disclosed technology. For ease of review, FIG. 7A is reproduced below as well:

| Task | "Original" | C++ |
|---|---|---|
| Configure the modem to connect to a cellular network | ATEO<br>AT + QCFG = "usbcfg", 0 × 2C7C, 0 × 125, 1, 1, 1, 1, 1, 1, 1<br>AT + QPCMV = 1, 2<br>AT + QTONEDET = 1<br>AT + QPOWD | ec25.configure( ) |
| Send an SMS message | AT + CMGF = 1<br>AT + CSCS = "GSM"<br>AT + CMGS = "phoneNumber"<br>message<br>Ctrl + Z | ec25.sendSMS<br>(phoneNumber, message) |
| Receive an SMS | AT + CSDH = 0<br>AT + CMGF = 1<br>AT + CMGL = "REC UNREAD" | ec25.receiveSMS(sms) |
| Place a voice call | ATD phoneNumber | ec25.placeVoiceCall<br>(phoneNumber) |
| End a voice call | ATH | ec25.endCall( ) |
| Get call status (e.g. connected, disconnected) | + CPAS: 4 | ec25.getCallStatus( ) |
| Receive a voice call | ATA | ec25.receiveVoiceCall( ) |
| Send an MMS | AT + QICSGP = 1, 3, fast.t-mobile.com , , , 1<br>AT + QIACT = 1<br>AT + QMMSCFG = "contextid", 1<br>AT + QMMSCFG = "mmsc","<br>http://mms.msg.eng.t-mobile.com/mms/wapenc"<br>AT + QMMSCFG = "sendparam", 6, 2, 0, 0, 2, 4<br>AT + QMMSCFG = "character", "ASCII"<br>AT + QMMSEDIT = 1, 1,"phoneNumber"<br>AT + QMMSEDIT = 5, 1, "attachment-file-name"<br>AT + QMMSEND = 100<br>AT + QMMSEDIT = 0<br>AT + QIDEACT = 1<br>AT + QFDEL = "attachment-file-name" | ec25.sendMMS(mmsConfig,<br>recipient, cc, bcc, title,<br>attachment) |

Column 700 includes some of the common tasks to be completed. For example, the task 730 can be "configure the modem to connect to a cellular network." Column 710 shows the AT commands that the user needs to be provided to the modem in order to complete the task 730. Column 720 shows the equivalent C++ code made possible by the disclosed technology. Similar commands also exist for NodeJS and Python. The equivalent Node-RED commands can be a node as shown in FIG. 6.

Figure 7B:
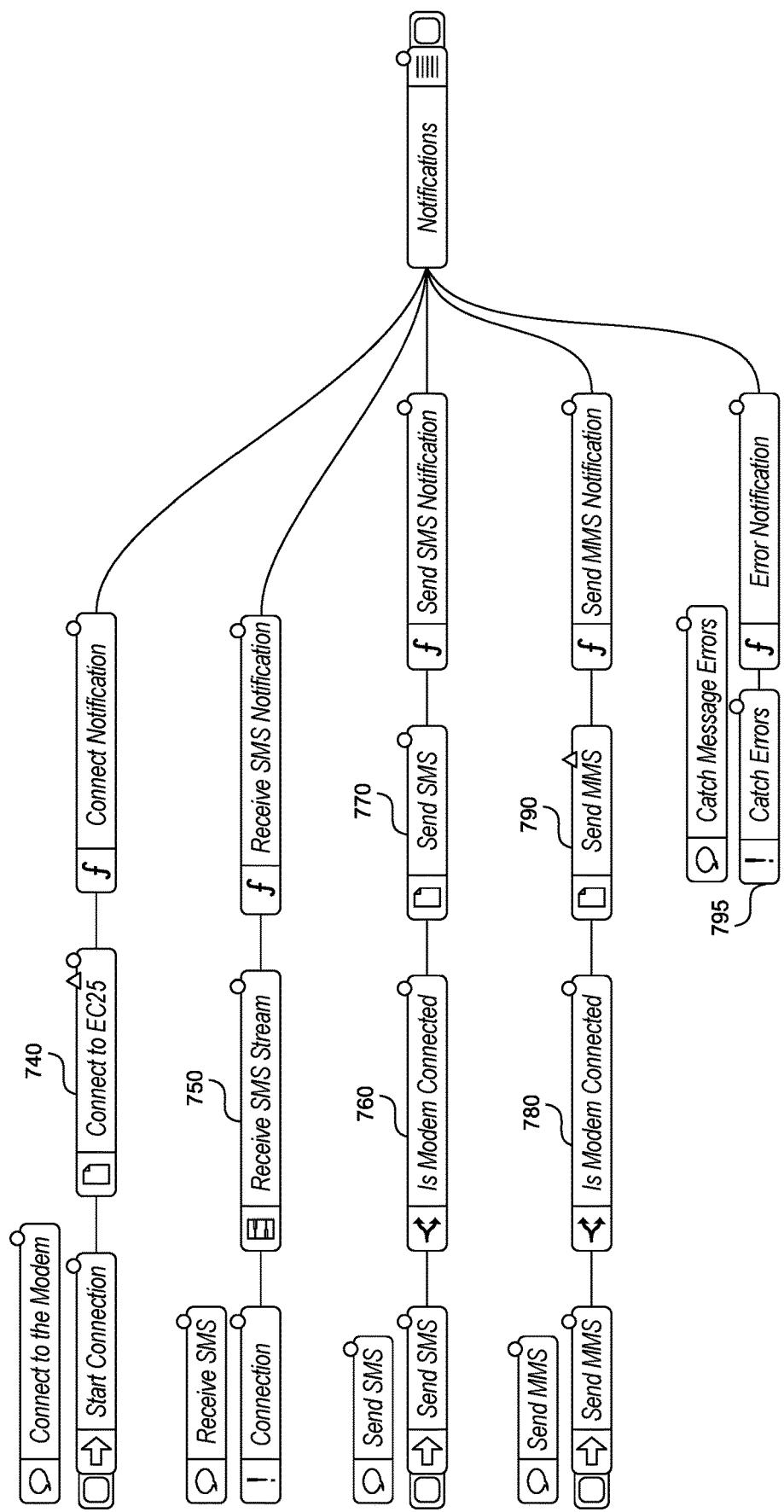
FIGS. 7B-7D show the Node-RED commands that can be used in place of AT commands to build common types of applications visually using little or no code.
Figure 7C:
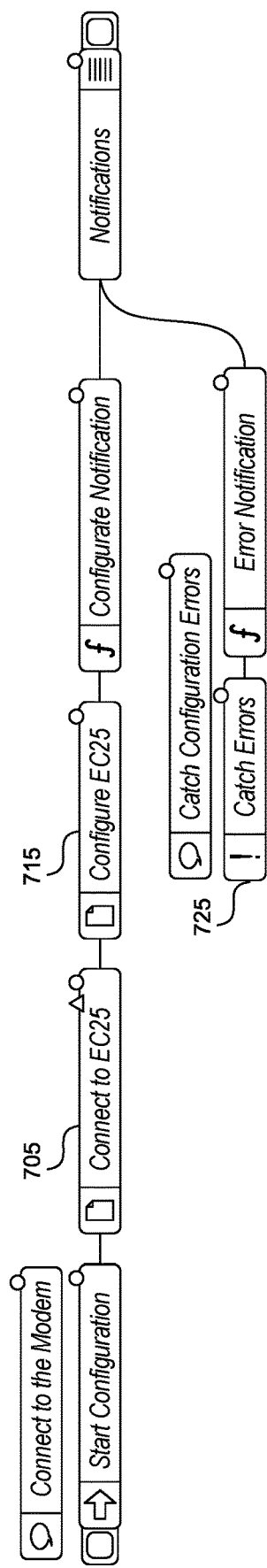
Figure 7D:
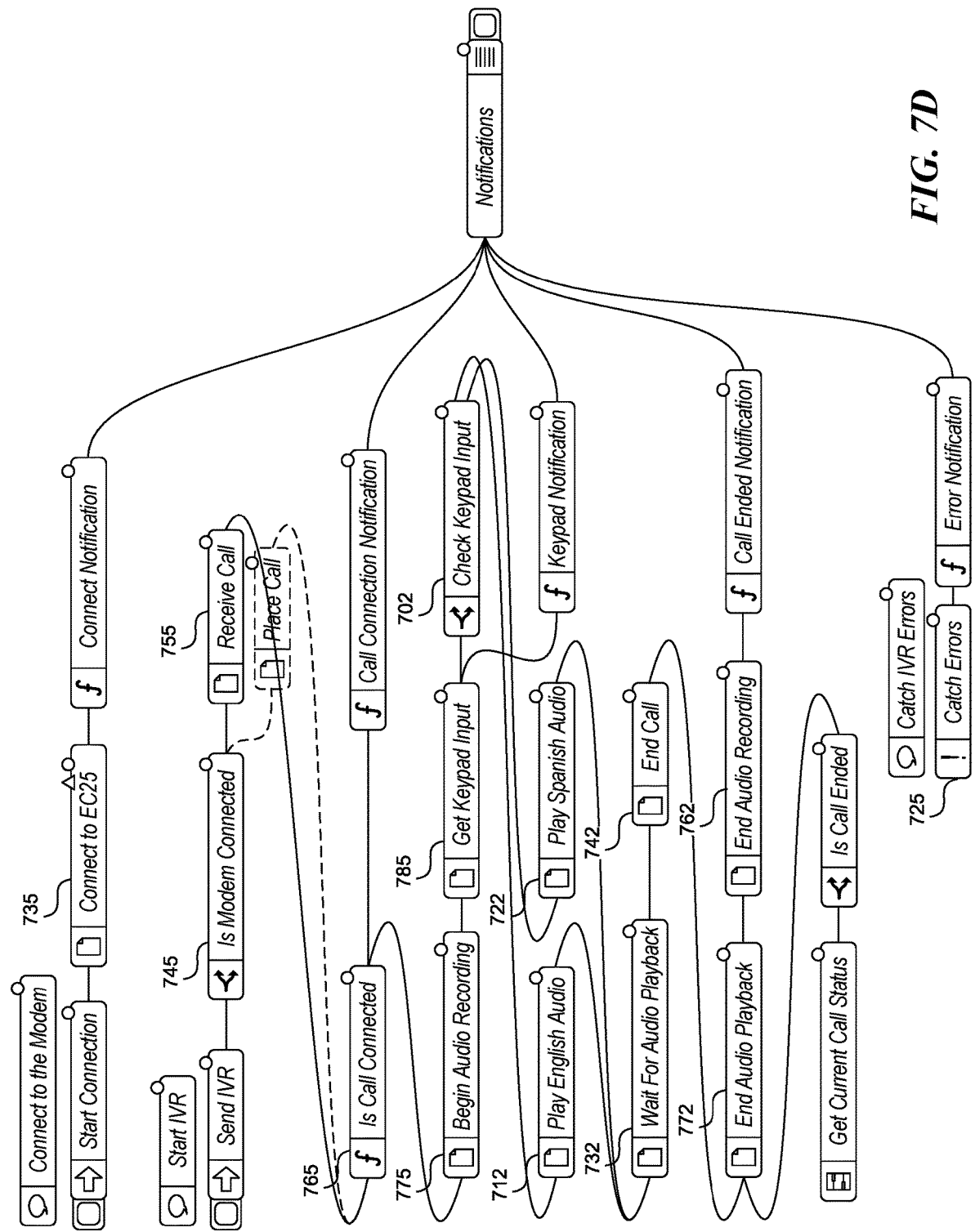

FIGS. 7B-7D show the Node-RED commands that can be used in place of AT commands to build common types of applications visually using little or no code. The common types of applications can include a chat bot, general modem configuration, and an interactive voice response workflow. FIG. 7B shows a Short Message Service (SMS)-based chat client, built with no code in Node-RED. Node 740 can establish a connection with the modem. Node 750 can receive an SMS stream. Node 760 can check whether the modem is connected, and if the modem is connected node 770 can send an SMS message. Node 780 can also check whether the modem is connected, and if the modem is connected, node 790 can send a Multimedia Messaging Service (MMS) message. Node 795 can catch any errors from the SMS-based chat client.

FIG. 7C shows instructions to configure a modem built with no code in Node-RED. Node 705 can connect to the modem. Node 715 can configure the modem, node 725 can catch any error notifications.

FIG. 7D shows a cellular Interactive Voice Response (IVR) system, implemented without any code using Node-RED. The IVR system can be implemented on a wireless telecommunication network. Node 735 can connect to the modem in communication with the wireless telecommunication network. Node 745 can check whether the modem is connected to the wireless communication networks, and node 755 can receive the call. Node 765 can check whether the call is connected. Node 775 can begin recording the audio. Node 785 can receive keypad input from the caller. Node 702 can check the keypad input to determine the value of the keypad input indicating the selection. Based on the value of the keypad input, the IVR system can execute node 712 or 722, playing English audio or playing Spanish audio, respectively, over the cellular connection. Node 732 can wait for the audio playback to finish. Node 742 can end the call. Node 772 "End Audio Playback" stops the playback of audio. Node 772 is executed after node 742 to prevent silence over the line. In other words, the IVR system hangs up, then stops talking as opposed to stopping talking and then hanging up. Node 762 can end the audio recording that was started in node 775. Node 752 can check whether any errors occur during the call.

Figure 8:
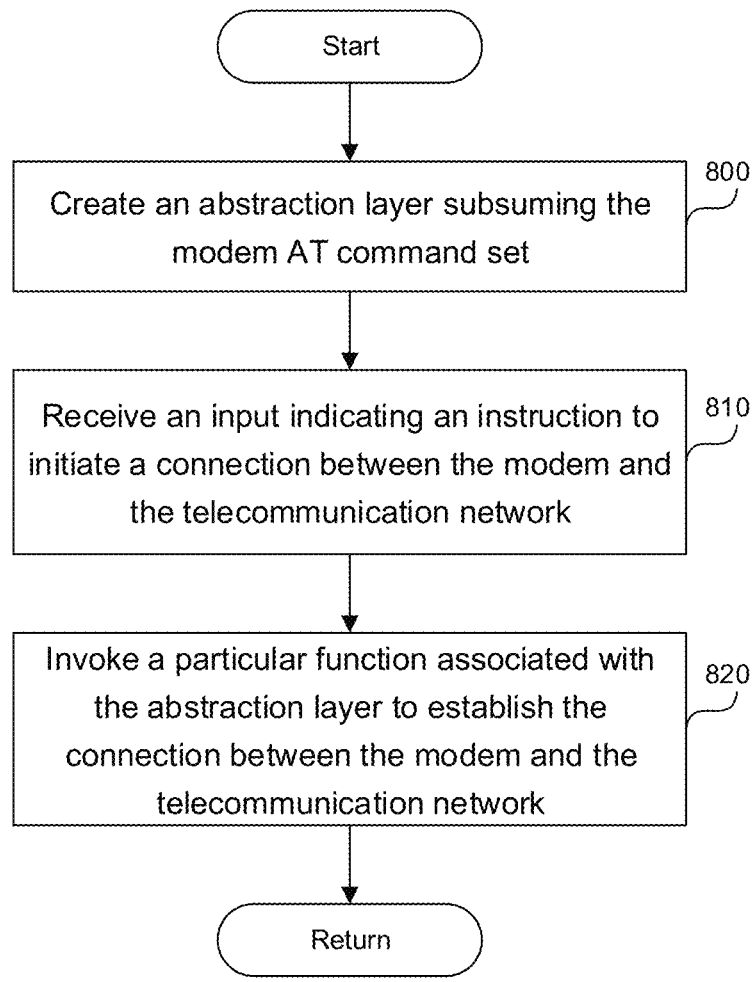
FIG. 8 shows a flowchart of a method to enable rapid prototyping of software for an Internet of Things (IoT) device.

FIG. 8 shows a flowchart of a method to enable rapid prototyping of software for an Internet of Things (IoT) device. An electronic device, e.g. an IoT device, capable of serial port communication, such as a Raspberry Pi or an Arduino, can communicate to a modem via the serial port. The modem is configured to connect to a telecommunication network and to execute instructions associated with a modem AT command set, as shown in FIG. 7A.

In step 800, a hardware or software processor associated with the electronic device and executing instructions described in this application can create an abstraction layer or application programming interface subsuming the modem AT command set, as shown in FIG. 7A. The abstraction layer provides a higher-level functionality than the modem AT command set and can be expressed in a higher-level programming language such as C++, Java, Python, Node-RED, etc.

The higher-level functionality includes a binding to multiple programming languages, and a visual programming user interface. The multiple programming languages can include such as Python, JavaScript and/or NodeJS. The visual programming language can include Node-RED and/or Scratch. The function associated with the abstraction layer includes multiple function calls to the modem AT command set. In other words, the higher-level functionality can replace multiple AT commands with a single call to the higher-level programming language or a single node in the visual programming user interface.

For example, as shown in FIG. 7A, the particular function can include configuring the modem to connect to a wireless cellular network. The abstraction layer, as shown in column 720, can include a single function call in place of multiple AT command calls, as shown in column 710. In another example, the particular function can include sending and receiving a Short Message Service (SMS) message sending and receiving a Multimedia Messaging Service (MMS) message, placing a phone call, receiving the phone call, checking a call status, sending and receiving an audio over phone calls, interpreting dial tones, and/or turning the modem on/off. The abstraction layer, as shown in column 720, can include a single function call in place of multiple AT command calls, as shown in column 710.

In step 810, the processor can receive an input indicating an instruction to initiate a connection between the modem and the telecommunication network. In step 820, the processor can invoke a particular function associated with the abstraction layer to establish the connection between the modem and the telecommunication network.

To increase the ease of use and speed of prototyping, the electronic device can provide a custom installation script configured to provide a browser-based visual programming tool on the electronic device enabling visual programming by instantiating nodes associated with the browser-based visual programming tool. The browser-based visual programming tool includes multiple nodes associated with the abstraction layer. When an instantiated node is executed, the electronic device performs instructions contained in the instantiated node. In addition, multiple instantiated nodes can be wired together as explained in FIG. 6 to create a sequence of commands. The sequence of commands can then be executed with a single click. The instantiated nodes can include a connection node. Upon instantiating and executing the connection node, the electronic device is connected to the telecommunication network.

To increase the ease of use and speed of prototyping, the electronic device can provide a browser-based visual programming tool on the electronic device enabling visual programming by instantiating nodes associated with the browser-based visual programming tool, as explained above and in relation to FIG. 6.

Similarly, to increase the ease of use and speed of prototyping, the electronic device can provide a custom installation script configured to provide a high-level programming language on the electronic device enabling high-level programming by executing functions associated with the high-level programming language. The high-level programming language includes multiple functions associated with the abstraction layer. The high-level programming language can be Python, JavaScript, and/or NodeJS. When a function of the high-level programming language is executed the electronic device performs instructions contained in the function. When the function includes AT commands to establish a connection, upon executing the function, the electronic device is connected to the telecommunication network.

Figure 9:
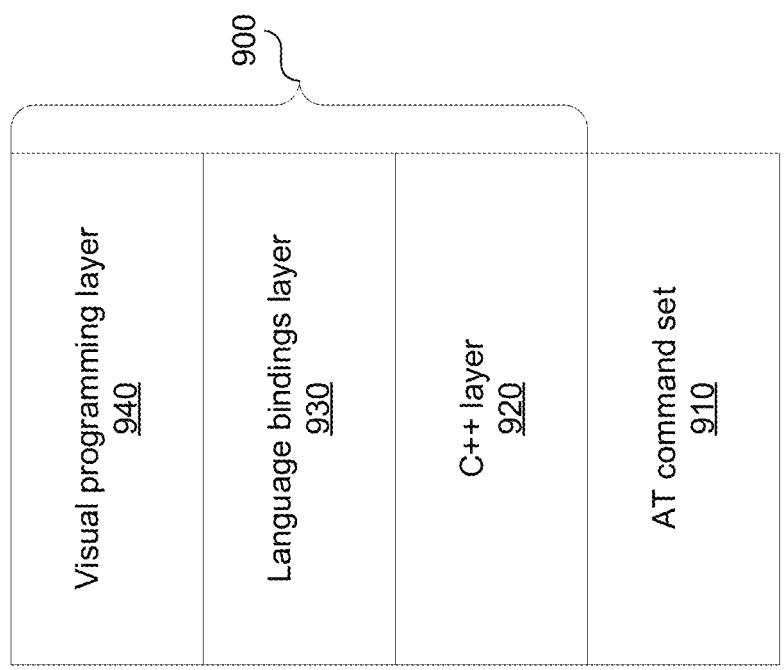
FIG. 9 shows an abstraction layer 900 subsuming the AT command set 910.

FIG. 9 shows an abstraction layer 900 subsuming the AT command set 910. The abstraction layer 900 can include multiple layers such as a C++ layer 920, a language bindings layer 930, and a visual programming layer 940. The C++ layer 920 makes calls to the AT command set 910 and enables the creation of the language bindings layer 930. The language bindings layer 930 makes calls to the C++ layer 920. The language bindings layer 930 can enable a user to program in a high-level programming language such as Python, JavaScript, and/or NodeJS.

The visual programming layer 940 can make calls to the high-level programming language provided by the language bindings layer 930. The language bindings layer 930 in turn calls the C++ layer 920, which in turn calls the AT command set 910.

Remarks

The terms "example," "embodiment," and "implementation" are used interchangeably. For example, reference to "one example" or "an example" in the disclosure can be, but are not necessarily, references to the same implementation, and such references mean at least one of the implementations. The appearances of the phrase "in one example" are not necessarily all referring to the same example, nor are separate or alternative examples mutually exclusive of other examples. A feature, structure, or characteristic described in connection with an example can be included in another example of the disclosure. Moreover, various features are described, which can be exhibited by some examples and not by others. Similarly, various requirements are described, which can be requirements for some examples but not other examples.

The terminology used herein should be interpreted in its broadest reasonable manner, even though it is being used in conjunction with certain specific examples of the invention. The terms used in the disclosure generally have their ordinary meanings in the relevant technical art, within the context of the disclosure, and in the specific context where each term is used. A recital of alternative language or synonyms does not exclude the use of other synonyms. Special significance should not be placed upon whether or not a term is elaborated or discussed herein. The use of highlighting has no influence on the scope and meaning of a term. Further, it will be appreciated that the same thing can be said in more than one way.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected" or "coupled," or any variant thereof, means any connection or coupling, either direct or indirect, between two or more elements; the coupling or connection between the elements can be physical, logical, or a combination thereof. Additionally, the words "herein," "above," and "below," and words of similar import, can refer to this application as a whole and not to any particular portions of this application. Where context permits, words in the above Detailed Description using the singular or plural number may also include the plural or singular number, respectively. The word "or" in reference to a list of two or more items covers all of the following interpretations of the word: any of the items in the list, all of the items in the list, and any combination of the items in the list. The term "module" refers broadly to software components, firmware components, and/or hardware components.

While specific examples of technology are described above for illustrative purposes, various equivalent modifications are possible within the scope of the invention, as those skilled in the relevant art will recognize. For example, while processes or blocks are presented in a given order, alternative implementations can perform routines having steps, or employ systems having blocks, in a different order, and some processes or blocks may be deleted, moved, added, subdivided, combined, and/or modified to provide alternative or sub-combinations. Each of these processes or blocks can be implemented in a variety of different ways. Also, while processes or blocks are at times shown as being performed in series, these processes or blocks can instead be performed or implemented in parallel, or can be performed at different times. Further, any specific numbers noted herein are only examples such that alternative implementations can employ differing values or ranges.

Details of the disclosed implementations can vary considerably in specific implementations while still being encompassed by the disclosed teachings. As noted above, particular terminology used when describing features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed herein, unless the above Detailed Description explicitly defines such terms. Accordingly, the actual scope of the invention encompasses not only the disclosed examples, but also all equivalent ways of practicing or implementing the invention under the claims. Some alternative implementations can include additional elements to those implementations described above or include fewer elements.

Any patents and applications and other references noted above, and any that may be listed in accompanying filing papers, are incorporated herein by reference in their entireties, except for any subject matter disclaimers or disavowals, and except to the extent that the incorporated material is inconsistent with the express disclosure herein, in which case the language in this disclosure controls. Aspects of the invention can be modified to employ the systems, functions, and concepts of the various references described above to provide yet further implementations of the invention.

To reduce the number of claims, certain implementations are presented below in certain claim forms, but the applicant contemplates various aspects of an invention in other forms. For example, aspects of a claim can be recited in a means-plus-function form or in other forms, such as being embodied in a computer-readable medium. A claim intended to be interpreted as a means-plus-function claim will use the words "means for." However, the use of the term "for" in any other context is not intended to invoke a similar interpretation. The applicant reserves the right to pursue such additional claim forms in either this application or in a continuing application.

The computer medium can include multiple media (e.g., a centralized/distributed database and/or associated caches and servers) that store one or more sets of instructions. The machine-readable (storage) medium can include any medium that is capable of storing, encoding, or carrying a set of instructions for execution by the computing system. The machine-readable medium can be non-transitory or comprise a non-transitory device. In this context, a non-transitory storage medium can include a device that is tangible, meaning that the device has a concrete physical form, although the device can change its physical state. Thus, for example, non-transitory refers to a device remaining tangible despite this change in state.

We claim:

1. A system to enable rapid prototyping of an Internet of Things (IoT) device, the system comprising:
   an electronic device capable of serial port communication,
      wherein the electronic device comprises a Raspberry Pi;
   a modem coupled to the electronic device and configured to connect to a telecommunication network,
      wherein the modem is configured to execute instructions associated with a modem AT command set;
   at least one hardware processor; and
   at least one non-transitory memory storing instructions, which, when executed by the at least one hardware processor, cause the system to:
      provide an abstraction layer subsuming the modem AT command set,
         wherein the abstraction layer provides a higher-level functionality than the modem AT command set,
         wherein the higher-level functionality includes a binding to multiple programming languages and a visual programming user interface representing the modem AT command set; and
         wherein a function associated with the abstraction layer includes multiple function calls to the modem AT command set;
      receive an input indicating an instruction to initiate a connection between the modem and the telecommunication network; and
      invoke a particular function associated with the abstraction layer to establish the connection between the modem and the telecommunication network.

2. The system of claim 1, further comprising instructions to:
   provide a custom installation script configured to provide a browser-based visual programming tool on the electronic device enabling visual programming by instantiating nodes associated with the browser-based visual programming tool,
      wherein the browser-based visual programming tool includes multiple nodes associated with the abstraction layer,
      wherein when an instantiated node is executed, the electronic device performs instructions contained in the instantiated node;
      wherein a node among the multiple nodes includes a connection node, and
      wherein upon instantiating and executing the connection node, the electronic device is connected to the telecommunication network.

3. The system of claim 1, further comprising instructions to:
   provide a custom installation script configured to provide a high-level programming language on the electronic device enabling high level programming by executing functions associated with the high-level programming language,
      wherein the high-level programming language includes multiple functions associated with the abstraction layer, wherein the high-level programming language includes Python, JavaScript, and NodeJS, and
wherein upon executing a function among the multiple functions, the electronic device is connected to the telecommunication network.

4. The system of claim 1, further comprising instructions to:
provide a browser-based visual programming tool on the electronic device enabling visual programming by instantiating nodes associated with the browser-based visual programming tool,
wherein the browser-based visual programming tool includes multiple nodes associated with the abstraction layer, and
wherein when an instantiated node is executed, the electronic device performs instructions contained in the instantiated node; and
provide a connection node in the browser-based visual programming tool,
wherein upon instantiating and executing the connection node, the electronic device is connected to the telecommunication network.

5. The system of claim 1, wherein the particular function comprises configuring the modem to connect to a wireless cellular network, and wherein the abstraction layer comprises a single function call in place of multiple AT command calls.

6. The system of claim 1, wherein the particular function comprises sending and receiving a Short Message Service message, sending and receiving a Multimedia Messaging Service message, placing a phone call, receiving the phone call, checking a call status, sending and receiving an audio over phone calls, interpreting dial tones, or turning the modem on/off; and
wherein the abstraction layer comprises a single function call in place of multiple AT command calls.

7. A method comprising:
configuring a modem in an Internet of Things (IoT) device by:
providing an abstraction layer subsuming a modem AT command set,
wherein the abstraction layer provides a higher-level functionality than the modem AT command set, and
wherein the higher-level functionality includes a binding to multiple programming languages and a visual programming user interface representing the modem AT command set, and
wherein a function associated with the abstraction layer includes multiple function calls to the modem AT command set;
receiving an input indicating an instruction to initiate a connection between the modem and a telecommunication network; and
invoking a particular function associated with the abstraction layer to establish the connection between the modem and the telecommunication network.

8. The method of claim 7, further comprising:
providing a custom installation script configured to provide a browser-based visual programming tool on the IoT device enabling visual programming by instantiating nodes associated with the browser-based visual programming tool,
wherein the browser-based visual programming tool includes multiple nodes associated with the abstraction layer,
wherein when an instantiated node is executed, performing instructions contained in the instantiated node;
wherein a node among the multiple nodes includes a connection node, and
wherein upon instantiating and executing the connection node, connecting to the telecommunication network.

9. The method of claim 7, further comprising:
providing a custom installation script configured to provide a high-level programming language on the IoT device enabling high level programming by executing functions associated with the high-level programming language,
wherein the high-level programming language includes multiple functions associated with the abstraction layer, and
wherein upon executing a function among the multiple functions, the IoT device is connected to the telecommunication network.

10. The method of claim 7, further comprising:
providing a browser-based visual programming tool on the IoT device enabling visual programming by instantiating nodes associated with the browser-based visual programming tool,
wherein the browser-based visual programming tool includes multiple nodes associated with the abstraction layer, and
wherein when an instantiated node is executed, performing instructions contained in the instantiated node; and
providing a connection node in the browser-based visual programming tool,
wherein upon instantiating and executing the connection node, connecting to the telecommunication network.

11. The method of claim 7, wherein the IoT device comprises a Raspberry Pi or an Arduino.

12. The method of claim 7, wherein the particular function comprises configuring the modem to connect to a wireless cellular network, and wherein the abstraction layer comprises a single function call in place of multiple AT command calls.

13. The method of claim 7, wherein the particular function comprises sending and receiving a Short Message Service message, sending and receiving a Multimedia Messaging Service message, placing a phone call, receiving the phone call, checking a call status, sending and receiving an audio over phone calls, interpreting dial tones, or turning the modem on/off,
and wherein the abstraction layer comprises a single function call in place of multiple AT command calls.

14. A computer-readable storage medium, carrying instructions, which, when executed by at least one data processor of a system, cause the system to:
enable rapid prototyping of an Internet of Things (IoT) device,
wherein the IoT device is capable of serial port communication,
including the instructions to:
provide an application programming interface subsuming a modem AT command set,
wherein the application programming interface provides a higher-level functionality than the modem AT command set,
wherein the higher-level functionality includes a binding to multiple programming languages and a visual programming user interface representing the modem AT command set, and wherein a function associated with the application programming interface includes multiple function calls to the modem AT command set;

receive an input from a user indicating an instruction to initiate a connection between the modem and a telecommunication network; and invoke a particular function associated with the application programming interface to establish the connection between the modem and the telecommunication network.

15. The computer-readable storage medium of claim 14, further comprising instructions to:

provide a custom installation script configured to install a browser-based visual programming tool on the IoT device enabling visual programming by instantiating nodes associated with the browser-based visual programming tool, wherein the browser-based visual programming tool includes multiple nodes associated with the application programming interface, wherein when an instantiated node is executed, the IoT device performs instructions contained in the instantiated node;

wherein a node among the multiple nodes includes a connection node, and wherein upon instantiating and executing the connection node, the IoT device is connected to the telecommunication network.

16. The computer-readable storage medium of claim 14, further comprising instructions to:

provide a browser-based visual programming tool on the IoT device enabling visual programming by instantiating nodes associated with the browser-based visual programming tool, wherein the browser-based visual programming tool includes multiple nodes associated with the application programming interface, and wherein when an instantiated node is executed, the IoT device performs instructions contained in the instantiated node; and provide a connection node in the browser-based visual programming tool, wherein upon instantiating and executing the connection node, the IoT device is connected to the telecommunication network.

17. The computer-readable storage medium of claim 14, further comprising instructions to:

remotely control a vehicle associated with the IoT device.

18. The system of claim 14, wherein the IoT device comprises a Raspberry Pi or an Arduino.

19. The computer-readable storage medium of claim 14, wherein the particular function comprises configuring the modem to connect to a wireless cellular network, wherein the application programming interface comprises a single function call in place of multiple AT command calls.

20. The computer-readable storage medium of claim 14, further comprising instructions to:

provide a custom installation script configured to provide a high-level programming language on the IoT device enabling high level programming by executing functions associated with the high-level programming language, wherein the high-level programming language includes multiple functions associated with the application programming interface, and wherein upon executing a function among the multiple functions, the IoT device is connected to the telecommunication network.

\* \* \* \* \*